Figure 1:
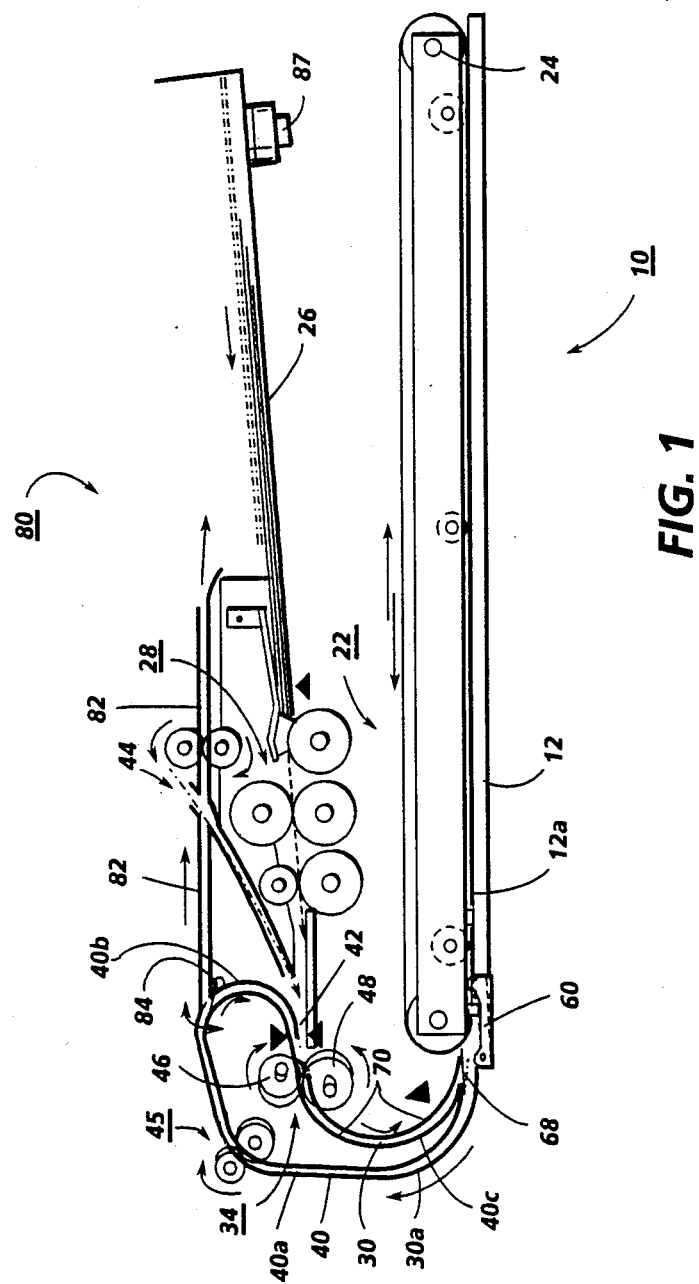

United States Patent [19]

Culligan et al.

[11] Patent Number: 4,881,729
[45] Date of Patent: Nov. 21, 1989

[54] RECIRCULATING DOCUMENT HANDLER WITH INTEGRAL SADH

[75] Inventors: Robert L. Culligan, West Henrietta Road; George J. Roller, Penfield, both of N.Y.

[73] Assignee: Xerox Corporation, Stamford, Conn.

[21] Appl. No.: 276,849

[22] Filed: Nov. 28, 1988

Related U.S. Application Data

[63] Continuation-in-part of Ser. No. 202,348, Jun. 6, 1988.

[51] Int. Cl.⁴ ............................................. B65H 5/26
[52] U.S. Cl. ............................................. 271/3.1; 271/9; 271/248; 271/291; 271/301; 355/318; 355/321
[58] Field of Search ........................ 271/3, 3.1, 9, 248, 271/291, 301, 902; 355/318, 321

[56] References Cited

U.S. PATENT DOCUMENTS

| | | | |
|---|---|---|---|
| 4,066,252 | 1/1978 | Wick | 271/3 |
| 4,078,789 | 3/1978 | Kittredge et al. | 271/65 |
| 4,385,825 | 5/1983 | Kaneko | 355/3 SH |
| 4,420,149 | 12/1983 | Schultes et al. | 271/10 |
| 4,483,528 | 11/1984 | Takeyama et al. | 271/9 |
| 4,523,752 | 6/1985 | Kigawa et al. | 271/9 |
| 4,579,325 | 4/1986 | Pinkney et al. | 271/3.1 |
| 4,579,326 | 4/1986 | Pinckney et al. | 271/31 |
| 4,660,963 | 4/1987 | Stemmle | 355/24 |
| 4,692,020 | 9/1987 | Tsujihara | 355/14 SH |
| 4,727,398 | 2/1988 | Honjo et al. | 355/3 SH |
| 4,727,401 | 2/1988 | Partilla et al. | 355/14 SH |
| 4,769,674 | 9/1988 | Kitajima et al. | 355/14 SH |
| 4,786,039 | 11/1988 | Ito | 271/3.1 |
| 4,819,023 | 4/1989 | Kitahar | 271/3.1 |

FOREIGN PATENT DOCUMENTS

| | | | |
|---|---|---|---|
| 149636 | 11/1979 | Japan | 355/24 |
| 61-2653 | 1/1986 | Japan | 271/225 |
| 23040 | 1/1986 | Japan | 271/3.1 |
| 226426 | 8/1986 | Japan | 271/291 |

Primary Examiner—Joseph J. Rolla
Assistant Examiner—Steven M. Reiss

[57] ABSTRACT

An improved dual mode document handler for a copier, in which documents may be either loaded into a document stacking tray overlying the copier imaging station platen and recirculatively fed thereto for pre-collation (RDH) copying, or, alternatively, fed into a semi-automatic document handling (SADH) path slot adjacent thereto on top of the document handler, conveniently face up and feeding downwardly therein for gravity assistance in loading documents into the slot. This SADH input path non-interferingly crosses over (intersects) the document restacking return path to the tray of RDH path. The SADH input path merges into the recirculating document path just after the stacking tray feeder/separator output and prior to the side registration feeder and turn baffles feeding to the copier platen (at a point in common with the duplex document inverting return path) to commonly utilize the same feeder and path, thereby providing alternative SADH/RDH document feeding at little additional cost in the same integral low cost document handler, and with a desirable SADH document input location, even though the document handler feeds and returns documents from the same side of the tray and platen.

6 Claims, 2 Drawing Sheets

RECIRCULATING DOCUMENT HANDLER WITH INTEGRAL SADH

The present invention was illustrated in, but not claimed in, an earlier-filed, and hereby cross-referenced, copending application (D/88103) by the same assignee, U.S. Ser. No. 07/202,348 filed June 6, 1988, by Ernest L. Dinatale and the same George J. Roller as herein. The priority benefit of said application is hereby claimed.

The present invention relates to an improved, low cost, dual input, dual mode, document handler for a copier. It is know to be desirable to provide both recirculating document handling (RDH) and semi-automatic document handling (SADH) in the same document handler for a copier with two separate document sheet inputs. The disclosed system provides this desirable feature at low cost with a simple integral document handling system, with a convenient choice and desirable location of the two operator document inputs.

Sets of documents may be stacked face up into a top loading document stacking tray for automatic document recirculation in a recirculation path from one side of the stacking tray to the copier imaging station and back to that same side, for desirable pre-collation copying. A convenient, intersecting, semi-automatic alternative document feeding path is also provided at very little additional cost, effectively utilizing many of the same components. This SADH path has a convenient operator input which allows face up rather than face down feeding of individual documents down into an entry slot in the top or upper surface of the document handler, unlike conventional, platen level, side loading, semiautomatic document feeders in recirculating document handlers. (E.g., U.S. Pat. No. 4,579,326 cited below.)

As disclosed, this SADH document feeding path is desirably provided here by crossing, without interfering with, the document restacking path for the recirculating document path, even though the document handler is of the type which feeds and restacks documents to and from the same side of the stacking tray to and from the same side of the platen imaging station of the copier. E.g., U.S. Pat. No. 4,769,674 issued Sept. 6, 1988 to T. Kitajima et al, and others noted hereinbelow.

By way of background, it is, of course, known for other applications to have copy sheet or other paper transport passages which intersect one another and/or where an entry path crosses an exit path. Examples include Japanese Laid open application 61-2653 laid open Jan. 8, 1986 to A. Mochizuki (Fuji Xerox); or U.S. Pat. No. 4,692,020 issued Sept. 8, 1987 to S. Tsujihara (Ricoh). Other background references include the following U.S. Pat. Nos. 4,420,149; 4,066,252; 4,078,789; 4,385,825; 4,579,326 and 4,660,963. Also, Japanese laid open No. 54-149636 Nov. 24, 1979.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Although faster, more accurate, and automatic feeding into and registration of each document at the correct position on the platen to be copied is highly desired, this is difficult to accomplish. One problem is that documents can vary widely in sheet size, weight, thickness, material, condition, humidity, age, etc.. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A-4, B-4, etc.). In contrast documents even in the same set may have come from completely different paper batches or have variably changed size with different age or humidity conditions, etc. Furthermore, the images on documents and their fusing can change the sheet feeding characteristics and these images may be subject to damage in feeding if not properly handled, e.g. smearing of fresh typewriting ink. Yet is is desirable to automatically or semi-automatically rapidly feed, register and copy even a mixture of sizes, types, and conditions of documents without documents jams or document damage and with each document correctly and accurately aligned to a desired registration position.

As noted, it has become an increasingly desirable feature to provide an alternative semi-automatic document handling (SADH) input, allowing an operator to "stream feed" originals into this SADH input of the copier document handler or feeder, to provide an alternative to stacking documents into the tray of the automatic document handler (ADH) or feeder (ADF), for automatic feeding from the stack of documents, with, in either case, the dual mode document handler providing all the deskewing, feeding and final registration of the documents into the copying position, and then ejecting the documents from the platen automatically.

A preferable document handling system is one that utilizes an existing or generally conventional copier optical imaging system, including the external transparent copying window (known as the platen or imaging station) of the copier. It is also desirable that the document handling system be readily movable away from the platen, as by pivoting up, to allow the copier operator to conveniently alternatively manually place documents, including books, on the same copying platen. Thus, a lighter weight document handler is desirable. It is also desirable that a document registration edge alignment or positioning system be available for such manual copying which is compatible with that used for or with the document handler.

In the description herein the term "document" or "sheet" refers to a usually flimsy sheet of paper, plastic, or other such conventional individual image substrate, and not to microfilm or electronic images, which are generally much easier to manipulate. The "document" is the sheet (original or previous copy) being copied in the copier onto the "copy sheet", which may be abbreviated as the "copy". Related, e.g. page order, plural sheets of documents or copies are referred to as a "set". A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

The present invention is particularly suitable for providing one low cost document handler with a choice of non-precollation or precollation copying. As noted, precollation copying is automatically plurally recirculated document set copying provided by a recirculating document handling system or "RDH".

Precollation, collation, recirculative, or RDH copying, as it is variably called, is a well known feature for a copier, in which any desired number of collated copy sets or books may be made by making a corresponding number of recirculations of the set of documents past the copier imaging station and copying each document page (normally only once, or twice) each time it circulates over the imaging station. The copies therefrom automatically exit the copier processor in proper collated order as precollated copy sets, and thus do not require subsequent collation in a sorter or collator.

However, a disadvantage of such precollation copying systems is that the documents must all be repeatedly separated and circulated for copying in a predetermined order a number of times equivalent to the desired number of copy sets. Thus, increased document handling is necessitated for a precollation copying system, as compared to a post-collation copying system. This may require more expensive separators and feeders to avoid document smearing or wear and for increased reliability.

In contrast, in a post-collation copying system, such as with an ADH or SADH, the desired number of copies may be made at one time from each document page, and plural copies many be post-collated by being placed in separate sorter bins of a copy output sorter. Thus, the documents need only be manually or semi-automatically fed to the imaging station once via the SADH input (if the number of copy sets being made is less than the number of available sorter bins). A disadvantage is that the number of copy sets which can be made in one document set feed is limited by the number of available sorter bins. Also, a sorter adds space and complexity and is not well suited for on-line finishing. However, post-collation copying is desirable in certain copying situations to reduce cost and complexity of the document handler, and/or minimize document handling, particularly for delicate, valuable, thick or irregular documents, or for a very large number of copy sets. Thus, it is desirable that a document handler for a precollation copying system be compatible with, and alternatively usable for, post-collation and manual copying as well.

Another desirable feature is a compatible system for inversion of duplex documents so that both sides can be copied. In particular, immediate inversion and copying of each duplex document can reduce the number of copies to be stored in the copier's duplex copy buffer tray as compared to a precollation copying system, or eliminate the duplexing buffer tray altogether. One current example of interest to the example here is disclosed in U.S. Pat. No. 4,777,511 issued Oct. 11, 1988 to M. Takahashi (Mita).

Further by way of background, in another DADH concept, documents are fed from the top of a stack overlying the platen and fed as with one inversion through a simplex path to one end of the platen and across to a registration hard stop at the far end of the platen, then copied, reversed and fed back off through a gate at said one end up through an inside duplex path without inversion into the top of the simplex path, adjacent the stack feeder/separator, and then back down onto the platen. Thus, in this case, there is only one inversion in the whole duplex loop, i.e. the duplex document inversion path is substantially circular as in the IBM TDB cited hereinbelow. It is a simple, single direction, loop. The document may pass through the same ADF cross-roll side registration system in both simplex and duplex modes, in the same direction. After copying both sides the duplex document ejects from the far end of the platen. Feeding and copying order is 1-N, thereby requiring output inversion for collation. This is shown in a U.S. application, Ser. No. 146,181, filed Jan. 20, 1988, and entitled "Automatic Document Conveying Device for Original in a Two-Sided Copy machine", based on FX/20656, Japanese Patent Application No. 62-247127, filed Feb. 6, 1987 and FX/20700, Japanese Patent Application No. 62-28177, filed Feb. 12, 1987.

Further by way of background, some current examples of prior art recirculating document handlers are disclosed in U. S. Pat. Nos. 4,076,408; 4,176,945, 4,278,344, 4,330,197, 4,466,733, and 4,428,667.

Of interest is the DADF disclosed in IBM TDB Vol. 14, No. 5, p. 1547, published October 1971. A more conventional duplex document inverter system with a circular inversion loop with only one inversion from and back to a platen is shown there, or in EK U.S. Pat. No. 4,714,241, issued Dec. 22, 1987; or in Koukai Gihoh Vol. 12-28, 87-8030, indicated as published July 20, 1987 (FX/21152).

Of particular interest re the subject DADF configuration is Canon U.S. Pat. No. 4,727,398 issued to T. Honjo et al Feb. 23, 1988, which bottom-feeds documents from one end of an over-platen tray and inverts and returns duplex documents at one side of the platen, but with a different duplexing inverting path. Another such reference is Canon U.S. Pat. No. 4,544,148, on a DADF with a similar document tray location but also having a different document inverting path from that disclosed herein (see, e.g., FIG. 8); and Canon U.S. Pat. No. 4,723,772 issued Feb. 9, 1988 to T. Hoji, et al.. Canon U.S. Pat. No.4,627,709 issued Dec. 9, 1986 to T. Kitajima et al, in Col. 6 describes a flexible sheet Mylar TM deflector 37 adjacent original passage outlet 12 to help guide the reversed original to another adjacent passage 26. See FIGS. 2A, 8A or 13A. This is in an RDH configuration similar to the above cited Canon patents.

U.S. Pat. No. 4,456,237 issued June 26, 1984 to M. H. Buddendeck, is noted particularly for its disclosure of a plural mode DADH/RDH with partially shared document paths with optional document reversal by reversible rollers 30 in the RDH document path.

The document side edge registration (cross-roller) system disclosed here is the same as that disclosed in Xerox Corporation U.S. Pat. No. 4,621,801 (D/83024), which corresponds to that in the Xerox Corporation "1065" copier automatic recirculating duplex document handling system.

The basic ADF per se shown herein, i.e., the simplex document path, but without any duplex document inverter or RDH input, and a suitable copier, etc., is also the subject of commonly assigned Xerox Corporation U.S. Pat. No. 4,727,401, issued Feb. 23, 1988 to S. R. Partilla and E. L. Dinatale (D/86035).

by way of further background description of a suitable copier with which this document handling system may be used, there is noted Xerox Corporation U.S. Pat. No. 4,708,462 on Dual Mode Duplexing issued to Denis J. Stemmle (D/84210D1). It discloses a copier which can select between immediate (direct loop path) duplexing or conventional duplex buffer tray (stack) duplexing, for optimizing duplex copying under various conditions (set size, sheet size, etc.).

As shown in the above-cited art, the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam-controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their general positions, counting the number of completed document set circulations and completed copies, etc. and thereby controlling the operation of the document and copy sheet feeders and inverters, etc..

It is a general feature of the system disclosed herein to provide various of the features, and to overcome various of the disadvantages and limitations, discussed above and in the cited references.

A specific feature disclosed herein is to provide a dual mode document handler with an improved semi-automatic document feeding path extending to and merging into and commonly utilizing a portion of the document recirculating path to feed documents from the semi-automatic document inserting entry to the imaging station for copying.

Features which may be provided by the system disclosed herein, individually or in combination, include, in a document handler for feeding documents to be copied at a copier imaging station, with a document stacking tray overlying the imaging station and accessible from the upper surface of said document handler;

a recirculating document handling system for sequentially feeding and recirculating a set of documents from and back to one side of said document stacking tray in a document recirculation path;

said document recirculation path including a document feeding path portion from said document stacking tray to an adjacent side of said imaging station;

said document recirculation path also including a document restacking return path portion for returning documents back from said same side of the imaging station to said same side of said document stacking tray;

a semi-automatic document feeding system integral said recirculating document handler for sequentially feeding individual document sheets to said copier imaging station in a semi-automatic document feeding path;

said semi-automatic document feeding path having a document inserting entry separate from said document stacking tray but adjacent thereto and also accessible from the upper surface of said document handler;

said semi-automatic document feeding path extending downwardly from said document inserting entry thereof to said document feeding path portion of said document recirculation path by intersecting and extending through said document restacking return path;

said semi-automatic document feeding path merging into and commonly utilizing said document feeding path portion of said document recirculation path to feed documents from said document inserting entry to said imaging station for copying.

Further features which may be provided by the system disclosed herein, individually or in combination, include those wherein said document recirculation path includes in said document feeding path portion a document feeder/separator at said one end of said stacking tray for sequentially feeding documents from said document stacking tray, and an integral document sheet side registration feeding system and an integral document inverting turn path between said document feeder/separator and said imaging station, and wherein said semi-automatic document feeding path merges into and utilizes said side registration feeding system and said integral document inverting turn path alternatively with documents being fed in said document recirculation path from said document stacking tray.

all references cited herein, and their references, are incorporated by reference herein for appropriate teachings of additional or alternative details, features, and/or technical background.

Figure 2:
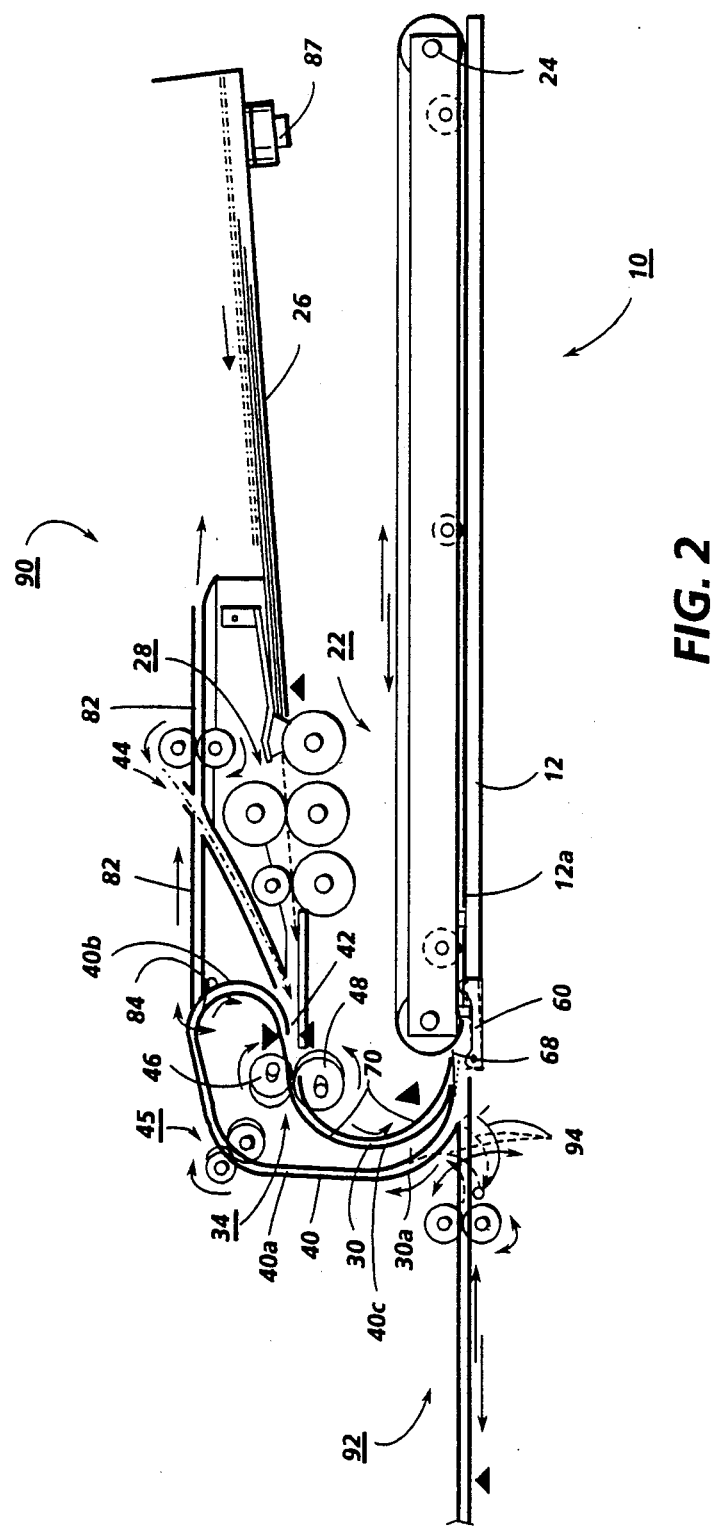

Various of the above-mentioned and further features and advantages will be apparent from, but are not limited to, the following specific examples of applications of the invention. The following description of these exemplary embodiments include drawing figures (approximately to scale) wherein:

FIG. 1 is a partly schematic side view of an exemplary dual mode (RDH/SADH) document handler (DH), capable of handling simplex or duplex documents, providing one example of the present invention; and FIG. 2 shows a modified inverter version of the embodiment of FIG. 1.

Referring to the examples of FIGS. 1 and 2, it will be appreciated that the system described herein may be utilized with various other document handlers, and with almost any copier, including various of those incorporated by reference herein. Thus, the only portion of an exemplary copier 10 which need be illustrated here is the copier platen 12.

The disclosed document handling system provides a choice of two top loading documents inputs; into RDH tray 26, or into semi-automatic document handling (SADH) input 44. Their feeding paths and guides or baffles interest, but do not interfere with one another because the DH sensor and control logic precludes feeding documents simultaneously from both said inputs. As is shown in the art, an SADH input is desirable for manual single document sheet input, or manually separating and stream-feeding documents. That may be a separate job or an interrupt or insert into an RDH job run being copied from a stacked set of documents in the RDH input tray 26.

In the exemplary RDH/SADF DH systems 80 or 90 disclosed here, various modes of operation are provided which desirably share trays, feeders, and paths. All the document copying paths include a single conventional platen 12 and its document platen transport 22 and its drive (preferably comprising a stepper or servo motor 24 with encoder). Various components are desirably shared with the RDH and SADH modes of operation of this document handler. Documents to be copied by the copier 10 are sequentially fed to the platen (imaging station) 12 by the document handler unit where they are driven over platen surface 12a into a desired copying registration position by the platen belt transport 22 with its drive 24, and then ejected by that transport system 22 from the platen 12. For recirculating (precollation) document copying, the set of original documents is initially loaded stacked face-up into the document stacking tray 26. They are sequentially fed out from the bottom of the stack by a conventional sheet separator/feeder 28 Document sheets are initially fed downstream from the tray 26 through a simplex path 30 to the acquisition entrance to the belt transport system 22, adjacent the platen 12. The tray 26 overlies the platen, and the path 30 conventionally provides the shortest possible path connection. The simplex path 30 has a single "C" shaped inversion inverting segment 30a. Thus the documents are turned over once before being presented to the platen. As will be described later herein, the initial portion of this simplex path 30, (just downstream of the separator/feeder 28, at the end of tray 26 and upstream of the inverting segment 30a) includes a document side edge registration and deskewing and feeding system 34. As will be further described herein, this system 34 may be a known crossed-rolls edge guide system, for example, that described in the cited U.S. Pat. No. 4,621,801. However, this document side edge system can be a different type, for example, the system described in a copending commonly assigned application U.S. Ser. No. 07/182,699 filed Apr. 18, 1988 by Lam Wong (D/88006).

The document feeding unit 80 or 90 may be alternatively utilized as a non-recirculating automatic document feeder (ADF) by placing the documents in tray 26 and feeding them to be copied but not returning them to the tray 26 after copying, or by only circulating them once.

If the documents are duplex documents requiring inversion, they may be inverted in a duplex path such as 40. The duplex path 40 here is a continuous unidirectional but non-circular loop which starts and ends at the same side of the platen. The duplex path 40 includes, in order, two inverting segments 40a and 40b and the single inversion inverting segment 30a of the simplex path 30. The duplex path 40 smoothly merges into the simplex path 30 at a path intersection 42 upstream of the edge registration and deskewing system 34 but downstream of the separator/feeder 28. At the intersection 42 each duplex document has been turned over twice from its orientation coming off the platen, and is feeding in the downstream direction into the simplex path 30, i.e., in the same feeding direction as a document being initially fed from the tray 26, as shown by the dashed arrow in FIG. 1.

Note that the alternate single sheet bypass or SADH input 44 may also be provided merging at this same location, as illustrated by the dot-dash arrow path. All three said paths 30, 40, 44 are entering the side edge registration and deskewing system 34, and may also use the same sensor, shown there schematically as a solid diamond. All three paths are delivering common at this point, and moving in a common direction into the edge registration and deskewing system 34.

The system 34 here includes fixed-position cross-rolls 46 and 48 acting on the document sheet near one edge. Thus the same edge registration and deskewing mechanism and mode of operation, and then the rest of the simplex path 30, can be used for all modes of operation and all documents.

Desirably, as shown and further described herein, the duplex path 40 in segment 40a or 40b also includes a set of sheet feed rolls 45 oppositely skewed to drive the duplex documents therein sideways, but oppositely to the side registration movement direction of the side edge registration and deskewing system 34, as well as forward. Thus the duplex documents are provided an appropriate transverse entry position for entry into the side edge registration and deskewing system 34, and reduced edge drag.

A known duplex document copying sequence may be utilized. Note Canon U.S. Pat. No. 4,727,398, cited above. If, for example, the stack of documents being copied is three duplex documents, these will be pages ½, ¾, 5/6, and the first document fed can be the bottom document 5/6. Side 5 will be fed face down at the platen first, through the common simplex path. But to provide 1-N order copying, the duplex document is preferably not copied at that point. It is removed and inverted and returned to the platen as described herein so that page 6 can be copied first. Then it may be inverted again in the same way to copy side 5. Then that document can be ejected and the next document fed and copied on both sides in the same manner. The cycle repeats until all duplex documents have been fed and copied.

Turning now to the end-of-platen area, a preferred pivotal edge guide 60 is disclosed here. In its operating position, only a smooth pyramid-shaped projection on the upper end of the guide unit 60 is extending above the platen surface 12a. This pyramid shaped projection is formed by two oppositely sloped document ramp surfaces, each at about 20-30 degrees angle from the horizontal, and both closely adjacent the edge of the platen. The inside ramps surface engages and upwardly deflects the edge of a duplex document being fed back off the platen. A thin flexible plastic baffle flap or automatic gate 68 prevents the reversed duplex document from entering the simplex path 30 outlet there, and deflects the document into the duplex path 40 entrance. For documents being fed onto the platen, which is always through the simplex path outlet, the document lead edge simply pushes the baffle or automatic gate 68 out of the way and then strikes the outside document ramp surface of gate 60. That ramp surface engages and upwardly deflects the edge of the document just as it is being fed onto the platen, and thereby insures that it will not catch on the edge of the platen. The flap 68 acts as a one-way valve to prevent documents from entering the simplex path, and to guide them into the duplex path, during an inversion cycle. The output ramp surface allows documents to be fed back off over the edge guide 60 after copying without having to lower the unit 60 with a solenoid. The opposing ramp surface on the input side serves as a document input ramp to lift the documents up over the platen edge.

This two-sided dual surfaced guide or cam 60 type of configuration is of particular value to DH's which feed documents onto and off off the same side of the platen, as in this disclosed system or as in the above-cited Canon U.S. Pat. Nos. 4,544,148, 4,579,327 or 4,627,709, or the generally corresponding Canon "7550" RDH. Documents can be fed past this platen registration edge guide 60 in either direction without any solenoid retraction being required. This edge-guide system 60 is compatible with various servo or stepper motor registration platen transports, i.e., with a document feeding into position and stopping type document registration system, which does not require a registration edge hard stop for non-manual document placements on the platen.

As noted, FIGS. 1 and 2 respectively show RDH/SADH unit versions 80 and 90. While the general concept of converting an ADF into an RDH by adding a restack path back to the top of the stack in the same tray (here the input tray 26) is known per se, as shown in the art, this additional mode of operation may be provided and accomplished here with very little hardware cost or modification. An RDH is provided very simply by adding a short restack path 82, and a conventional solenoid actuated gate 84 deflecting documents into this restack path 82 from the top of the duplex path 40, after the inverting segment 40a and before the inverting segment 40b. Thus, simplex documents may be repeatedly recirculated for precollation copying by being fed in the normal manner through simplex path 30 to the platen to be copied, then reversed after copying to feed back through only the first part 40a of the duplex path 40 and then via the short restack path 82 back to the tray 26. Duplex documents may be recirculated in the same manner, except for additional sequential circulations through the full duplex path 40 to provide inversion and proper page presentation order, as described above.

With the addition of a restack path 82 as described above, the need for a separate output path and output tray may be eliminated altogether for any mode of operation. The tray 26 can provide for output restacking.

Although the FIG. 1 RDH version 80 is satisfactory, especially for low volume or infrequent duplex document use applications, the FIG. 2 RDH version 90 is capable of higher productivity duplex document copying. It additionally provides an additional inverter 92 of a conventional type with reversible rolls and an additional gate 94 for input/output to the inverter chute. This reduces the number of circulations of the duplex documents in this overall configuration. Here, this inverter 92 is located near the beginning of the duplex path 40, in the plane of the platen, over the top of the copier, as described in said U.S. Pat. Nos. 4,621,801, 4,579,362, or the like.

Note that this exemplary gate 94 at the entrance to the added inverter chute adjacent the duplex path 40a entrance in FIG. 2 is a curved 3-position gate. It pivots into one of three positions: to allow sheet entrance to the inverter 92 chute (solid-line position); or to block entrance to inverter 92 and help deflect sheets into the duplex path 40; or (uppermost dashed-line position) to act as a different deflector to deflect reversed sheets coming back out of the inverter 92 chute up into the duplex return path, i.e. to provide an inverter return path.

In both the FIGS. 1 and 2 RDH configurations 80 and 90 of this duplex document feeder, the single optional gated return path 82 from the top of the duplex inverting loop path into the top of the document tray, at the same tray side, provides for optional recirculation of the document set at minimal additional cost. Only one inversion, by the first "C" shaped path segment 40a of the duplex inverter path 40, is used between the platen edge and the tray eject or restack path 82. The simple gate 84 deflects the sheet horizontally into this short path 82, which preferably has conventional sheet eject rolls for appropriately ejecting the sheet into the tray 26 on top of the stack. But since that will not result in inversion of a duplex sheet upon its return to the platen (through the simplex path) the full inverter loop 40 may also be used in the FIG. 1 embodiment, or the inverter 92 may be used in the FIG. 2 embodiment.

In both the RDH versions 80 and 90, the same advantages are retained. That is, common path usage of the same single stack separator/feeder 28, the same edge-registration and deskewing system 34, and the same platen transport 22 and its registration drive system 24.

Particularly for RDH operation, a set separator and rear edge tamper and/or tray vibrator 87 may be additionally provided for restacking and set integrity maintenance in tray 26.

Sheets initially fed in through the SADH slot path 44 may either outputed after copying into the feed tray 26 or outputed into a separate catch tray, as in a DADF version. If desired, a second, alternative, straight through feeding, SADH path may be provided by providing a conventional SADH input at the one side of the platen and an SADH output catch tray at the other side of the platen.

As noted above, considerable commonality between the duplex and simplex document paths and their hardware is provided in the disclosed document handler configurations herein. Little additional hardware is required for the added duplex capability. Auto duplex is provided simply by adding a low cost compact inversion path to the basic simplex RDH/SADH configuration. This is provided in the disclosed examples by only two baffles, one set of nip (sheet feed) rollers 45 and a flexible baffle 68 providing a self-actuating gate.

With this duplexing system, "immediate" duplexing can be done, not requiring a duplex buffer tray in the copier. However, regular duplexing can also be done, storing plural copies of the first side copies in the duplex buffer tray, as shown in the above-cited U.S. Pat. No. 4,708,462. Also, two documents can be placed on the platen at once with this system, which can be used for simplex/duplex copying, as taught in the above-cited U.S. Pat. No. 4,727,401.

The illustrated example of the duplex inversion loop path 40 here comprises an outer "C" shaped duplex path segment 40a outside of but overlying and generally parallel to the inner "C" shaped simplex path 30a, with path 40a smoothly transitioning with an oppositely facing C-shaped path segment 40b interconnection into path 30a at the top ends of said two "C" shaped paths, and with the two "C" shaped paths 40a, 30a merging at their bottom ends adjacent the platen edge. By having upper parts of these path baffles integral a pivotally liftable top cover of the DH unit, easy jam clearance can can be provided to the paths.

The disclosed system feeds a duplex document from the platen, before or after it has been copied on one side, back up to, and then utilizes, the regular, simplex document, input sensor and input skewed cross-roller side registration system, and the entire simplex path back to the platen, and the same simplex forward registration system (a count from a trail edge sensor). Thereby there is a considerable savings in parts, i.e., the latter components all provide a dual-mode function. And a separate optional inverter path, at the opposite end of the platen, is not required. i.e., unlike the Xerox "1065" copier RDH of U.S. Pat. No. 4,621,801, for example, an opposite end of platen and opposite end of tray inverter path and a "racetrack" RDH path is not required. The duplex inverter path here is integral the feeding end of the document tray, but on the outside of the simplex path. Thus it is easily added on as a module. Furthermore, because the entrance to the duplex path is outside, not inside, the simplex path exit, a stationary baffle duplex path entrance can be used and no solenoid or other driven gate is required to direct documents into the duplex path vs the simplex path.

The additional feed rollers 45 in the duplex inverter path 40 can be driven by the same stepper motor, but preferably are oppositely skewed to initially move the returning duplex document sheet away from the side registration edge, by about 2 mm of side-shift, to avoid edge drag in the duplex inversion path. Then the sheet is moved back into side registration when it is acquired by the regular input skewed cross-rollers and edge slot side edge registration system 34, here that of Xerox Corporation D/83024 - U.S. Pat. No. 4,621,801.

Duplex documents may be stacked in normal order and orientation in the document input tray 26. They may be stacked, as shown, face up in normal 1−N order from the top to bottom so that the feeding and copying order is N−1. The document input tray 26 is conveniently located open on top of the document handler unit, and overlying the platen, and closely adjacent the SADH input slot there.

To summarize, documents to be stack fed, especially for recirculation, are sequentially fed from the bottom of the stack in tray 26 to the platen, in the same path for either simplex and duplex. That common path from the tray to the platen includes a single inversion, conventionally provided by a 180 degree baffled path turn 60a between the stack feeder 28 and one side of the platen. Adjacent the platen the document sheet is acquired by the platen transport belt system 22 and fed onto the platen to be copied. Then, in this system, for duplex documents, the belt is reversed to reverse-feed the document back off the same side of the platen. (After copying is completed the belt may continue to drive the document forward off the other side of the platen.) As the document is fed back off the same side of the platen, the document meets a deflector and baffle system and the duplex document is deflected up into the duplex return path, which is outside of the common path, and has two inversions, and returns the document back into the top of the common path just after the stack feeder/separator but ahead of (upstream of) the side registration system and the single inversion in that path, so that a total of three inversions plus side re-registration, are provided in the total loop path from the platen to the return back to the platen, thereby returning the document inverted from its previous orientation on the platen, and re-registered using the exact same registration system as for simplex. I.e., there is only one common deskew mechanism for all documents. Also, there is good throughput, especially in view of the short path lengths.

Conventionally, additionally connected to the copier controller are document sheet lead and/or trail edge sensors strategically positioned around the document path. An acquired document may be temporarily stopped at a "wait" station position in the input path before it is transported onto the platen, i.e. to briefly wait for the completion of copying of the preceding document already on the platen.

Describing further the exemplary side edge registration and deskewing system 34, from U.S. Pat. No. 4,621,801, in the operation of the document handler all documents 27 fed from the tray 26, or SADH slot 44, or duplex return 40b, are side registered and deskewed in system 34, and then initially inverted once, in hemicylindrical first inversion sheet path baffles 70. At one side or edge of this curved edge registration guide there is an integral arcuate (hemi-cylindrical) slot with smooth generally parallel sides closely spaced from one another, (preferably substantially less than one centimeter) but spaced apart by a distance substantially greater than the thickness of the thickest document to be fed. A suitable such slot width is approximately 2.5 mm measured perpendicular to the document plane. The bottom of this slot provides a smooth, low friction, surface against which one edge of each document sheet is deskewed and side-registered and slides along as it is being fed by deskewing rollers 48 and 46 through the arcuate baffles 70. That is, as the document is being fed to the nip between the platen surface 12a and the platen transport belt 22. The strict document control provided by the continuous confinement of the edge of the document being deskewed and side registered inside this edge slot enables side registration to be done even though the document is being arcuately deformed.

With this system 34, each document sheet is accurately side-registered only just before it is fed onto the platen 12, and each time it is fed or circulated. The document cannot skew or de-register before being immediately acquired by the non-slip platen transport. No on-platen side registration, or downstream side registration, or accurate restack registration, is required. Likewise, all deskewing is accomplished in this same step, and lead edge deskewing is not required anywhere in this system The platen transport need only provide for linear, non-skewing, feeding so as not to induce uncorrectably gross side mis-registration or skewing in the recirculation process. Since the platen transport 22 does not allow slippage of the document relative thereto, the upstream side registration and deskewing provided in this system is strictly maintained as the document is transported across the platen into the desired registration position. As noted, such a non-slip platen transport system is practical only with upstream deskewing of the document. [Conventional on-platen deskewing against a mechanical registration edge is not practicable with a non-slip platen transport.]

Discussing further this upstream side registration and deskewing system 34 disclosed herein, as further discussed in the above-cited U.S. Pat. No. 4,621,801, an appropriate limited sideways or lateral vector force component is induced in the document sheet by the different friction, and oppositely skewed, rollers 46 and 48. Here, these paired and nipped roller pairs preferably include a neoprene rubber or other relatively high friction driven roller 48 and a mating idler roller 46 of smooth stainless steel or the like. The high friction driving roller 48 is preferably at an angle of approximately $3\frac{1}{2}$ degrees toward the document side edge registration wall (the slot bottom in the edge guide). The opposing smooth low friction idler roller 46 is here skewed in the opposite direction, away from the edge guide, by approximately 7°. The lateral vector force component of feed wheel 48 continuously urges the edge of the document fully into the guide slot until it is fully abutting the slot bottom, which edge registers and deskews that document sheet. The opposing skew roller 46 then assists the resistance of the slot bottom to further attempted lateral document movement force by roller 48. The slot bottom is, of course, parallel the primary direction of document motion.

Because the edge guides slot and the rest of the baffles 70 are continuously arcuate, the document is likewise arcuately curved therein. This provides high beam strength. That is, the deskewing and side registration drive force by rollers 46 and 48 is at an area in which the document sheet beam strength has been maximized by the document being highly curved into a closely controlled semi-cylindrical configuration, which very greatly increases the resistance of the document sheet to wrinkling or buckling (and therefore jamming) during this edge registration and deskewing process. The close spacing of the opposite sides of the edge guide slot prevents even flimsy sheets from wrinkling, waving or buckling from the forces deskewing them.

As long as the document sheet feeds through the rollers 46 and 48, they continuously maintain a constant urging of the document edge against the edge guide slot bottom. The document edge slides freely in this slot.

It is particularly important to note here that no other input feeder is required for SADH document input 44. This same side registration and deskewing system 34 also serves as the initial acquiring and input feeder, and the feeder for feeding the document downstream to the platen transport 22, for documents from the SADH input. In contrast, in the RDH mode the initial document input feeder function is provided by feeder/separator 28.

While the embodiments disclosed herein are preferred, it will be appreciated that they are merely examples, and that various alternatives, modifications, variations or improvements may be made by those skilled in the art from this teaching, which are intended to be encompassed by the following or subsequent claims:

What is claimed is:

1. In a document handler for feeding documents to be copied at a copier imaging station, with a document stacking tray overlying the imaging station and accessible from the upper surface of said document handler:
   a recirculating document handling system for sequentially feeding and recirculating a set of documents from and back to one side of said document stacking tray in a document recirculation path;
   said document recirculation path including a document feeding path portion from said document stacking tray to an adjacent side of said imaging station;
   said document recirculation path also including a document restacking return path portion for returning documents back from said same side of the imaging station to said same side of said document stacking tray;
   a semi-automatic document feeding system integral said recirculating document handler for sequentially feeding individual document sheets to said copier imaging station in a semi-automatic document feeding path;
   said semi-automatic document feeding path having a document inserting entry separate from said document stacking tray but adjacent thereto and also accessible from the upper surface of said document handler;
   said semi-automatic document feeding path extending downwardly from said document inserting entry thereof to said document feeding path portion of said document recirculation path by intersecting and extending through said document restacking return path;
   said semi-automatic document feeding path merging into and commonly utilizing said document feeding path portion of said document recirculation path to feed documents from said document inserting entry to said imaging station for copying.

2. The document handler of claim 1, wherein said document recirculation path includes an integral document sheet side registration feeding system therein between said document stacking tray and said imaging station, and wherein said semi-automatic document feeding path connects with and commonly utilizes said side registration feeding system alternatively with documents being fed in said document recirculation path from said document stacking tray.

3. The document handler of claim 1 wherein said document recirculating path includes a document feeder/separator for sequentially feeding documents from said document stacking tray, and a side registration drive system in said document recirculation path for side registration of documents fed thereby, and wherein said semi-automatic document feeding path merges into said document recirculation path between said document feeder/separator and said document side registration drive system.

4. The document handler of claim 1 wherein said document recirculation path restacking return path portion overlies said document feeding path portion; and wherein said document feeding path portion initially includes a document feeder/separator for sequentially feeding documents from said document stacking tray; and wherein said document feeding path portion also includes a side registration drive system for side registration of documents fed thereby; and wherein said semi-automatic document feeding path merges into said document feeding path portion of said document recirculation path between said document feeder/separator and said document side registration drive system.

5. The document handler of claim 1, wherein said document recirculation path includes an integral document inverting turn path therein between said document stacking tray and said imaging station for turning over documents fed therebetween, and wherein said semi-automatic document feeding path connects with and commonly utilizes said integral document inverting turn path alternatively with documents being fed in said document recirculation path from said document stacking tray.

6. The document handler of claim 1, wherein said document recirculation path includes in said document feeding path portion a document feeder/separator at said one end of said stacking tray for sequentially feeding documents from said document stacking tray, and an integral document sheet side registration feeding system and an integral document inverting turn path between said document feeder/separator and said imaging station, and wherein said semi-automatic document feeding path merges into and utilizes said side registration feeding system and said integral document inverting turn path alternatively with documents being fed in said document recirculation path from said document stacking tray.

* * * * *